Patented June 20, 1950

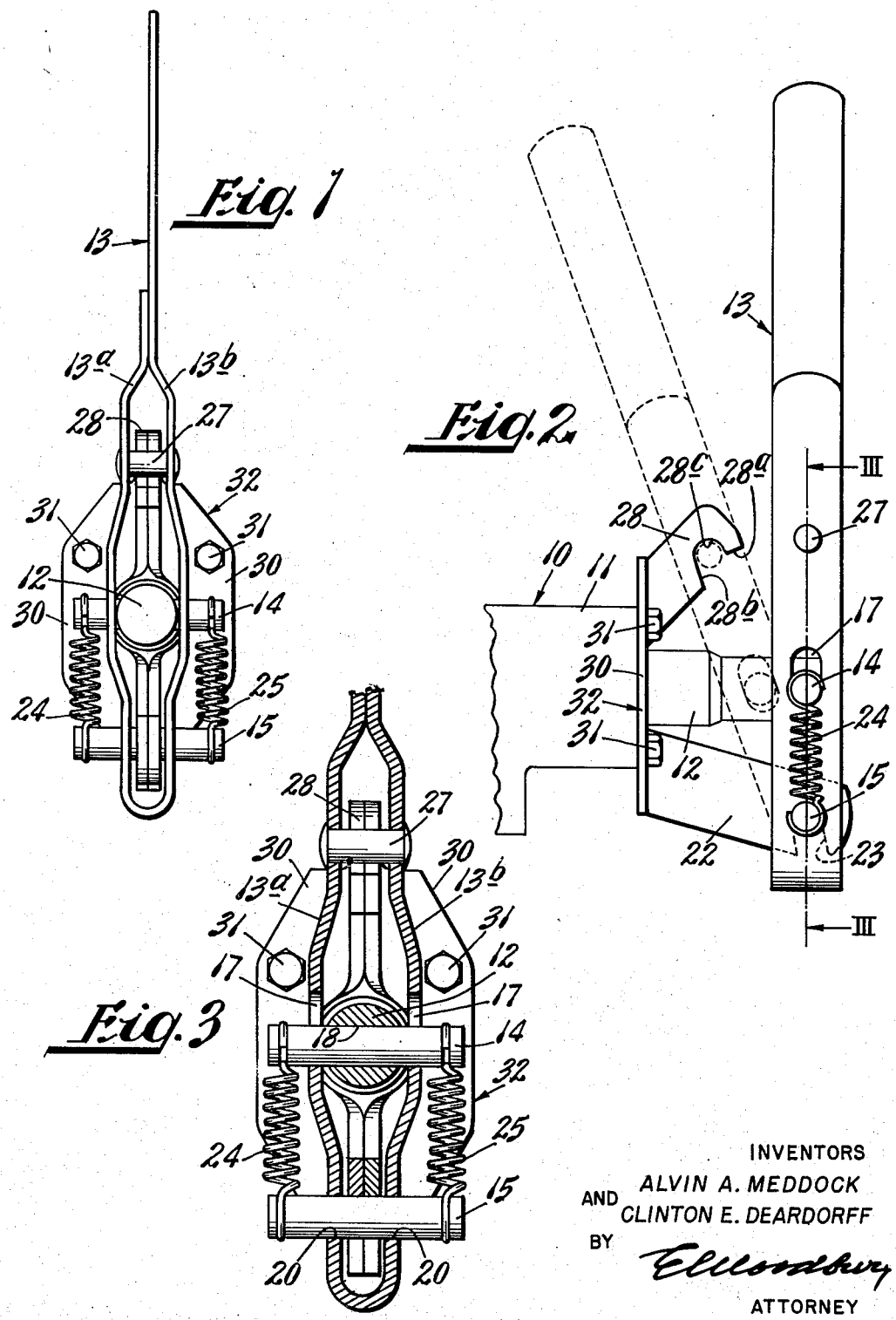

2,512,312

UNITED STATES PATENT OFFICE 2,512,312

LEVER HANDLE DETENT AND RELEASE

Clinton E. Deardorff, San Fernando, and Alvin A. Meddock, North Hollywood, Calif., assignors to Bendix Aviation Corporation, South Bend, Ind., a corporation of Delaware Application April 5, 1948, Serial No. 18,888

1 Claim. (Cl. 74—532)

This invention relates to manual actuating mechanisms for manipulating control valves in hydraulic systems, particularly slide valves that are intended to be releasably locked in one position of operation.

An object of the invention is to provide a simple and effective actuating mechanism whereby a hydraulic slide valve can be moved into any one of a plurality of positions, and locked or unlocked, with only one hand.

This object is achieved in accordance with the invention by providing an actuating lever that is fulcrumed in a slot so that the lever has limited longitudinal movement, in addition to swinging movement through an arc, providing a latching member on the lever that is movable therewith longitudinally into and out of engagement with a fixed latching member when the lever is in a predetermined position in its arc of movement, and providing a spring means for urging the lever longitudinally to interengage the latch members.

A full understanding of the invention may be had from the following detailed description with reference to the drawing, in which:

Fig. 1 is an end elevation of a mechanism in accordance with the invention;

Fig. 2 is a side elevation; and

Fig. 3 is a vertical section taken in the plane III—III of Fig. 2.

The invention is illustrated in connection with a hydraulic valve 10 comprising a casing 11 and a reciprocable valve rod 12 extending from one end of the casing. The valve is actuated by reciprocating the rod into various longitudinal positions. Valves of this general type are well known, and the internal construction of the valve is of no interest. Suffice it to state that the rod 12 may be manually moved into a plurality of longitudinal positions for creating certain desired conditions of fluid flow, and that it has, in addition, one position in which it may be desirable to lock it while the operator leaves the valve to perform other operations. In the particular valve illustrated in Fig. 2 this position in which the rod 12 is to be locked is its innermost or leftmost position.

The actuating mechanism in accordance with the present invention comprises a lever 13 which is pivotally connected to the valve rod 12 by a first pin 14 and is fulcrumed on a second pin 15.

As best shown in Figs. 1 and 3, the lever 13 may be formed from a single strip of metal folded upon itself over a portion of its length so as to form a bifurcate element straddling the valve rod 12. The two parts 13a and 13b of the bifurcate element 13 are provided with longitudinal slots 17—17, and the valve rod 12 is provided with a cylindrical aperture 18 for receiving the first pin 14. It will be observed that this construction prevents any vertical movement of the pin 14 with respect to the valve rod 12 but permits longitudinal movement of the lever 13 with respect to the pin. The bifurcate portions 13a and 13b are provided near their lower ends with cylindrical apertures 20 for the second pin 15, so that the latter is constrained to move with the lever. The second pin 15 is supported by a fulcrum arm 22 having a slot 23 therein for receiving the pin 15.

The pins 14 and 15 extend substantially beyond the bifurcate elements 13a and 13b of the lever, and the ends of the pin 14 are connected to the ends of the pin 15 by a pair of helical tension springs 24 and 25 respectviely. These springs exert a constant force on the lever 13 urging it upward to the limit of the slots 17 therein, which engage the pin 14.

The valve rod 12 may be reciprocated through a definite range by simply swinging the lever 13 through an arc of movement about the second pin 15 while the latter is held in the upper end of the slot 23 by the springs 24 and 25, as illustrated in Fig. 2.

The valve rod 12 can be moved into its extreme inner (leftmost) position by urging the lever 13 longitudinally (downwardly) to the extent of movement permitted by the slots 17, to carry a latch pin 27 in the lever below a shoulder 28a of a stationary latch member 28 and then rocking the lever 13 to the limit of its movement, which carries the latch pin 27 against a shoulder 28b on the stationary latch member 28. If the operator so desires, he can lock the lever in this last mentioned position by releasing it, which permits the springs 24 and 25 to shift the lever longitudinally and carry the latch pin 27 into a notch 28c in the stationary latch member 28. Obviously, the rod 12 can be moved out of its innermost position by depressing the lever 13 to carry the latch pin 27 out of the notch 28c and clear of the shoulder 28a on the stationary latch member and then rocking the lever clockwise.

The fulcrum member 22 and the latch member 28 may be formed integrally with a pair of plates 30 which are bolted to the valve casing 11 as by cap screws 31. Each of the integral elements 32, consisting of a plate 30, and arms 22 and 28, may be bent from a single piece of flat metal.

It will be observed that the actuating mechanism described is relatively simple, and easily and inexpensively fabricated. At the same time it permits locking of the valve rod in one position without the addition of any separate control element that would require for its actuation either the other hand of the operator or any of the fingers of the one hand, since locking movement is effected by bodily movement of the lever 13.

Although for the purpose of explaining the invention, a particular embodiment thereof has been shown and described, obvious modifications will occur to a person skilled in the art, and we do not desire to be limited to the exact details shown and described.

We claim:

An actuating mechanism for manual manipulation of a linearly movable element into different positions comprising: a control lever positioned approximately at right angles to said element to be manipulated; means coupling an intermediate portion of said lever to said element for pivotal movement with respect thereto, and for limited linear movement longitudinally of the lever; a stationary support and means coupling a portion of said lever longitudinally displaced therealong from said first coupling means to said stationary support for swing movement thereabout, and for limited linear movement longitudinally of the lever; a latch member on said lever longitudinally displaced from said coupling means; a stationary latch member engageable with said lever latch member when the lever is in one end of its swinging movement and in one limit of its longitudinal movement, and spring means urging said lever longitudinally into said one limit of its longitudinal movement; whereby said lever can be locked in said one end of its swinging movement by moving it longitudinally against the force of said spring means into its other limit of longitudinal movement, swinging it into said one end of its swinging movement, and permitting said spring to restore it into its said one limit of longitudinal movement.

CLINTON E. DEARDORFF.
ALVIN A. MEDDOCK.

REFERENCES CITED

The following references are of record in the file of this patent:

UNITED STATES PATENTS

| Number | Name | Date |
|---|---|---|
| 803,494 | Long | Oct. 31, 1905 |
| 887,523 | Redlon | May 12, 1908 |
| 994,955 | Sayre | June 13, 1911 |
| 1,491,717 | Mace | Apr. 22, 1924 |
| 2,141,779 | Wenn | Dec. 27, 1938 |
| 2,202,217 | Mallory | May 28, 1940 |